(12) United States Patent
Jain et al.

(10) Patent No.: US 7,519,699 B2
(45) Date of Patent: Apr. 14, 2009

(54) METHOD, SYSTEM, AND COMPUTER PROGRAM PRODUCT FOR DELIVERING DATA TO A STORAGE BUFFER ASSIGNED TO AN APPLICATION

(75) Inventors: Vinit Jain, Austin, TX (US); Kavitha Vittal Murthy Baratakke, Austin, TX (US); Jeffrey Paul Messing, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 10/912,498

(22) Filed: Aug. 5, 2004

(65) Prior Publication Data

US 2006/0031409 A1   Feb. 9, 2006

(51) Int. Cl.
G06F 15/173    (2006.01)
(52) U.S. Cl. .................. 709/223; 709/224; 709/227; 709/228
(58) Field of Classification Search ................ 709/223, 709/224, 227, 228; 710/56
See application file for complete search history.

(56) References Cited

U.S. PATENT DOCUMENTS

| | | | |
|---|---|---|---|
| 6,549,934 B1 * | 4/2003 | Peterson et al. ............. 709/203 |
| 6,907,042 B1 * | 6/2005 | Oguchi ........................ 370/412 |
| 6,947,430 B2 * | 9/2005 | Bilic et al. ............. 370/395.71 |
| 7,080,147 B2 * | 7/2006 | Wang et al. .................. 709/227 |
| 2003/0154288 A1 * | 8/2003 | Takamura et al. ........... 709/227 |
| 2003/0236819 A1 * | 12/2003 | Greubel ....................... 709/201 |
| 2005/0204058 A1 * | 9/2005 | Philbrick et al. ............. 709/238 |
| 2006/0029059 A1 * | 2/2006 | Fernandes et al. ........... 370/389 |
| 2006/0031524 A1 * | 2/2006 | Freimuth et al. ............ 709/227 |
| 2008/0183838 A1 * | 7/2008 | Jain et al. .................... 709/213 |

* cited by examiner

*Primary Examiner*—Lashonda T Jacobs
(74) *Attorney, Agent, or Firm*—Casimer K. Salys; Dillon & Yudell LLP

(57) ABSTRACT

A method, system, and computer program product in a computer-readable medium for delivering data, received from a network, to a storage buffer assigned to an application is proposed. An application designates a communication buffer within a local data processing system for buffering data communicated with an application. The local data processing system reports to a network interface of the local data processing system a memory address of the designated communication buffer, and the data processing system creates a cookie containing the memory address. The data processing system then sends the cookie form the local data processing system to a remote data processing system, such that the remote data processing system may address data directly to the designated communication buffer.

1 Claim, 5 Drawing Sheets

METHOD, SYSTEM, AND COMPUTER PROGRAM PRODUCT FOR DELIVERING DATA TO A STORAGE BUFFER ASSIGNED TO AN APPLICATION

CROSS-REFERENCE TO RELATED APPLICATIONS

The present application is related to the following co-pending U.S. patent application filed Aug. 5, 2004, and incorporated herein by reference in its entirety:

Ser. No. 10/912,497, entitled "METHOD TO REDUCE NETWORK DATA COPIES"

BACKGROUND OF THE INVENTION

1. Technical Field

The present invention relates in general to data processing and in particular to improving efficiency of data receipt and distribution within a data processing system connected to a network. Still more particularly, the present invention relates to a system, method and computer program product for delivering data received from a network directly to a storage buffer assigned to an application.

2. Description of the Related Art

The profusion of applications exchanging data across networks now enables a range of technologies inconceivable only a few years ago. Applications exchanging data over a network range from email clients and servers to World Wide Web browsers communicating with servers to Voice-over-Internet-Protocol (VoIP) applications.

Some applications are able to tolerate high levels of latency and delay in data receipt. Examples include electronic mail and file transfer protocol clients. These clients were not designed to require the perception of 'real time' interaction with the network, and users will tolerate a substantial aggregate delay between the time at which information is requested and the time at which it is received. Users are, however, generally less tolerant of the loss of information between the sending and receiving points.

When the Internet protocols were first designed to support network applications, this lack of sensitivity to delay was exploited to create a highly redundant protocol called the Transport Control Protocol (TCP). In the use of TCP on a local data processing system, data for applications is routed from common buffers to application-specific buffers. The result, while providing a highly-reliable systemic backbone for networked applications, also builds delay into the receipt of data as data is internally copied within a data processing system from common buffers to application-specific buffers.

An example of this problem is illustrated in FIG. 4, which depicts a data processing system in a network environment, delivering data received from a network directly to a common buffer and copying that data to an application-specific buffer according to conventional methods. The illustrated network environment includes a local or wide area network 400, such as the Internet or another packetized digital network. A local data processing system 402, a remote data processing system 404 (e.g., an FTP server, an HTTP server, a simple mail transfer protocol (SMTP) and Post Office Protocol 3 (POP3) or Internet Message Access Protocol (IMAP) server, or a file server) are attached to network 400.

Remote data processing system 404 performs functions related to the sending and receiving of electronic data, including receiving requests for files and sending files across network 400.

Local data processing system 402 includes a processing resource 406 for performing data processing functions and a storage unit 408 for storing items of data or instructions for use by processing resource 406. Local data processing system 402 also includes a network interface 410 for communicating with other devices attached to network 400 and an input device 412. As illustrated, storage unit 408 stores applications 413, operating system (OS) 414, network driver 416, Transmission Control Protocol/Internet Protocol (TCP/IP) stack 418, common buffers 420, and application-specific buffers 424, 425, and 426.

In the prior art, application 413 sends a data request 428 to TCP/IP stack 418, and TCP/IP stack 418 routes data request 428 to network driver 416. Network driver 416 then passes data request 428 to operating system 414, which, through the operation of processing resource 406, sends data request 428 to remote data system 404 over network 400 via network interface 410.

Under the prior art technique, remote data processing system 404, upon receiving data request 428, responds to data request 428 with data delivery 430, which remote data processing system 404 sends over network 400 to network interface 410 of local data processing system 402. Processing resource 406 routes data delivery 430 from network interface 410 to operating system 414 in storage unit 408. Once data delivery 430 has arrived within storage unit 408, operating system 414 routes data delivery 430 from network driver 416 to TCP/IP stack 418. Data delivery 430 is then routed to common buffers 420. Once data delivery 430 reaches common buffers 420, a copy 432 of data delivery 430 is routed to application specific buffer 426, where processing resource 406 can employ copy 432 in conjunction with the instructions of applications 413. The prior art technique results in a high-latency environment, wherein time and resources are wasted. Increasingly, applications such as VoIP or streaming video require the lowest possible delivery latency for information. What is needed is a way to eliminate delay within a local data processing system.

SUMMARY OF THE INVENTION

A method, system, and computer program product for delivering data, received from a network, to a storage buffer assigned to an application are disclosed. An application designates a communication buffer within a local data processing system for buffering data communicated with the application. The local data processing system reports to a network interface of the local data processing system a memory address of the designated communication buffer, and the data processing system creates a cookie containing the memory address. The data processing system then sends the cookie from the local data processing system to a remote data processing system, such that the remote data processing system may address data directly to the designated communication buffer.

In one embodiment, the present invention includes receiving in the network interface a packet containing a cookie and delivering data from the packet to said communication buffer.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE ILLUSTRATIVE EMBODIMENT

Figure 1:
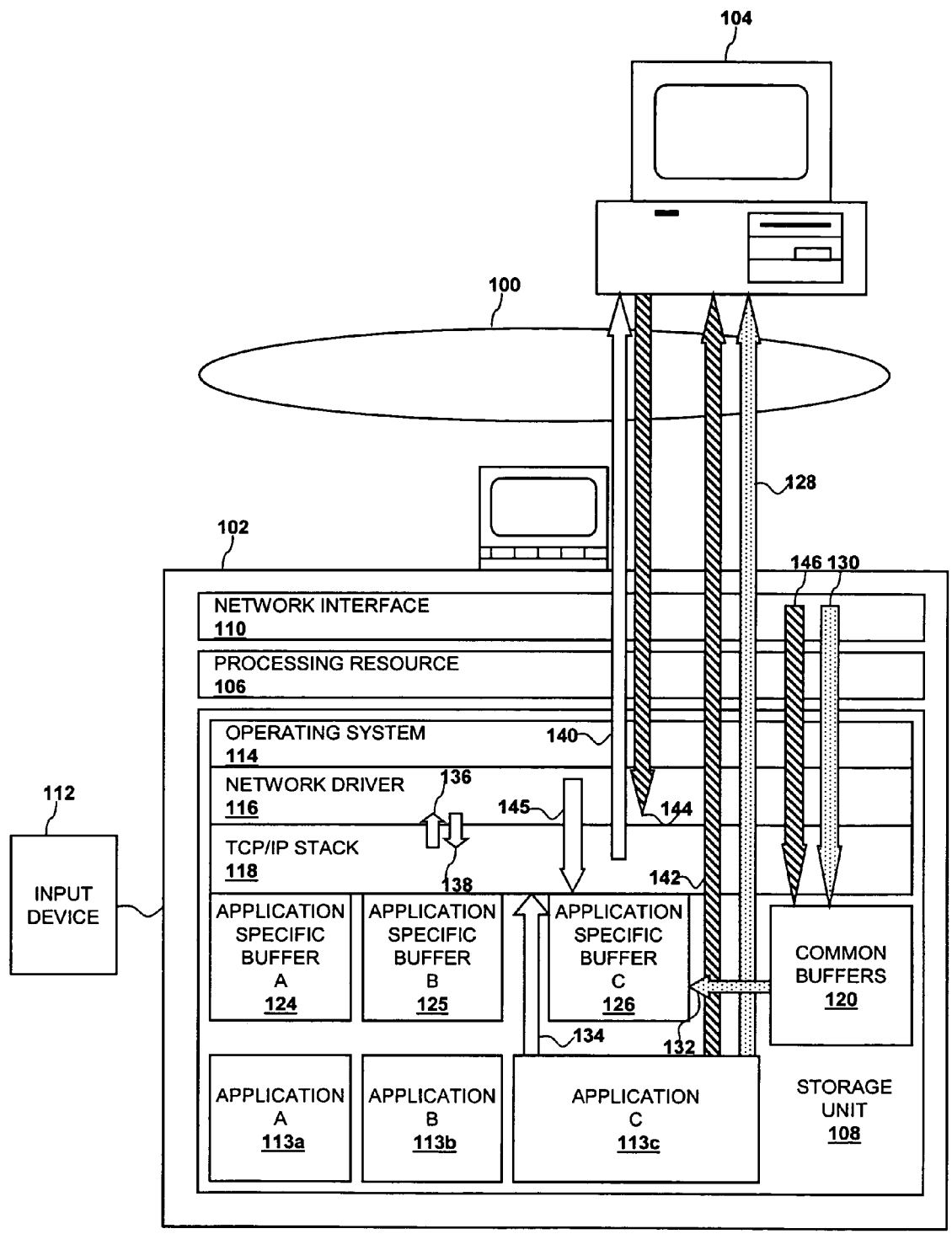
FIG. 1 illustrates a data processing system in a network environment, in which preferred embodiments of the method, system and computer program product for delivering data received from a network directly to a storage buffer assigned to an application are implemented.

With reference now to the figures and in particular with reference to FIG. 1, there is depicted an exemplary network environment with which the present invention may be advantageously utilized. The illustrated network environment includes a local or wide area network 100, such as the Internet or another packetized digital network. A local data processing system 102, a remote data processing system 104 (e.g., an FTP server, an HTTP server, a simple mail transfer protocol (SMTP) and Post Office Protocol 3 (POP3) or Internet Message Access Protocol (IMAP) server, or a file server) are attached to network 100.

Remote data processing system 104 performs functions related to the sending and receiving of electronic data, including receiving requests for files and sending files across network 100. Remote data processing system 104 and local data processing system 102 may both be implemented with conventional or later-developed hardware or software.

Local data processing system 102 includes a processing resource 106 for performing data processing functions and a storage unit 108 for storing items of data or instructions for use by processing resource 106. Local data processing system 102 also includes a network interface 110 for communicating with other devices attached to network 100 and an input device 112, such as a keyboard or mouse.

Turning in detail to storage unit 108, storage unit 108 may be implemented as a Random Access Memory (RAM) or as another form of storage, such as a dynamic access storage device. As illustrated, storage unit 108 stores application A 113a, application B 113b and application C 113c (any of which can be kernel applications or user space applications), operating system (OS) 114, network driver 116, Transmission Control Protocol/Internet Protocol (TCP/IP) stack 118. As illustrated, storage unit 108 also contains several communication buffers, including common buffers 120 (also called kernel buffers), and application-specific buffers 124 (corresponding to and servicing application A 113a), 125 (corresponding to and servicing application B 113b), and 126 (corresponding to and servicing application C 113c). In the preferred embodiment depicted in FIG. 1, each application-specific buffer corresponds to and services an individual application, though one skilled in the art will quickly ascertain that some applications may advantageously share data, in which case an application-specific buffer may correspond to and service more than one application, and that multiple applications may then access the data contained within one application-specific buffer.

The present invention improves efficiency of data receipt in a data processing system, such as local data processing system 102, by immediately directing a portion of data received through network 100 from remote data processing system 104 to application-specific buffers 124, 125, and 126, rather than allowing all of data received through network 100 from remote data processing system 104 to be routed to common buffer 120 before being copied to application-specific buffers 124, 125, and 126. This is accomplished through the use of several messages, which are sent and received by local data processing system 102 and detailed with respect to the subsequent flowchart diagrams, and with respect to FIG. 1.

Figure 2A:
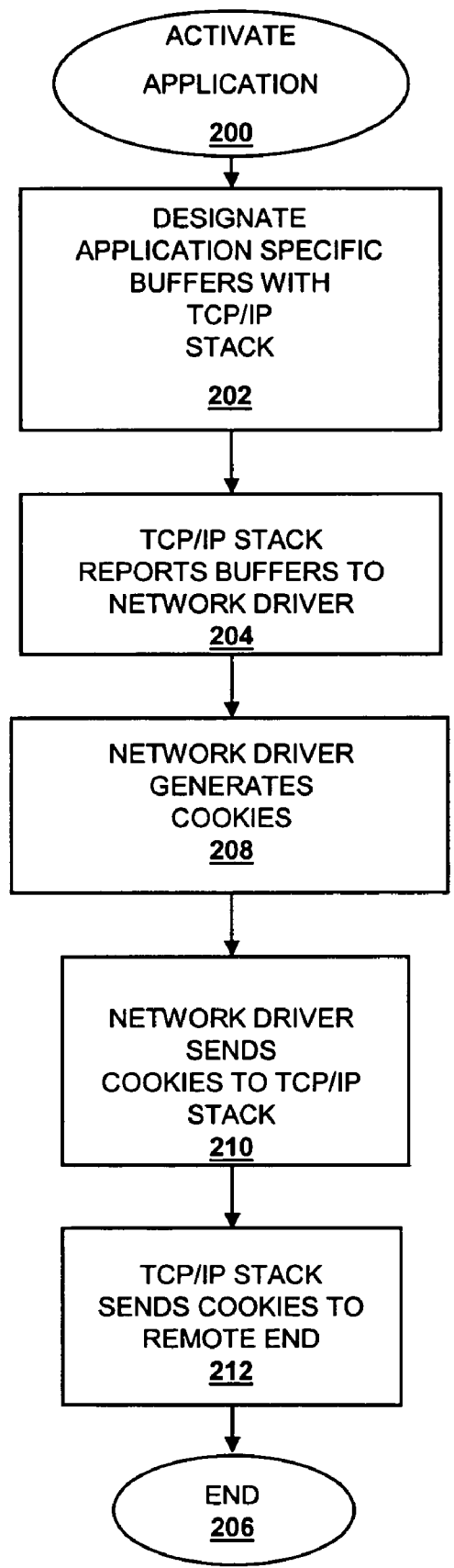
FIG. 2A is a high-level logical flowchart of a process for designating, registering, and reporting a buffer, and creating and sending a cookie to enable delivery of data, received from a network, to a storage buffer assigned to an application in accordance with a preferred embodiment of the present invention.

With reference now to FIG. 2A, there is depicted a high-level logical flowchart of a process for designating, registering, and reporting a buffer and creating and sending a cookie, to enable the delivery of data, received from a network, to a storage buffer assigned to an application in accordance with a preferred embodiment of the present invention. The process begins at step 200, which depicts activation of an application 113c on local data processing system 102. The process then proceeds to step 202, which illustrates application 113c designating application-specific buffer 126 as its associated buffer. As depicted in FIG. 1, in one embodiment application 113c designates a communication buffer, such as application specific buffer 126, for storage of its data by sending a designation message 134 from application 113c to TCP/IP stack 118.

The process of FIG. 2A next moves to step 204, which depicts TCP/IP stack 118 reporting designation of application-specific buffer 126 to network driver 116. Reporting designation of application-specific buffer 126 to network driver 116 is accomplished when TCP/IP 118 stack sends reporting message 136, containing a memory address of a communication buffer, to network driver 116, as shown in FIG. 1. The memory address from reporting message 136 is then sent to network interface 110. The process then proceeds to step 208, which illustrates network driver 116 generating cookie 138. Cookie 138 may optionally contain data relating to the size of application-specific buffer 126, allowing remote data processing system 104 to optimally prepare data to be sent in units of a size corresponding to the storage available in application-specific buffer 126. Network driver 116 registers application specific buffer 126 and cookie 138 with network interface 110. Additionally, some embodiments may use multiple application-specific buffers 124-126 for a single application, without departing from the scope of the present invention. Similarly, some embodiments may register multiple buffers using multiple cookies to support a single application, without departing from the scope of the present invention. The process then proceeds to step 210, which depicts network driver 116 sending cookie 138 to TCP/IP stack 118, whereupon TCP/IP stack 118 associates cookie 138 in storage with application 113c and associated application-specific buffer 126.

The process next moves to step 212, which depicts TCP/IP stack 118 sending cookie 138 encapsulated within cookie delivery message 140 over network 100 to remote data processing system 104. In order to transmit cookie 138, TCP/IP stack 118 sends cookie delivery message 140 containing cookie 138 to network driver 116. Network driver 116 then passes cookie delivery message 140 to operating system 114, which, through the operation of processing resource 106, sends cookie delivery message 140 to remote data system 104 over network 100 via network interface 110. The process shown in FIG. 2A terminates at step 206. Information contained in cookie 138, exchanged at the TCP/IP stack 118, may be largely transparent to remote data processing system 104. The exchange of information through cookie 138 through TCP/IP stack 118 increases interoperability of the present invention.

Figure 3A:
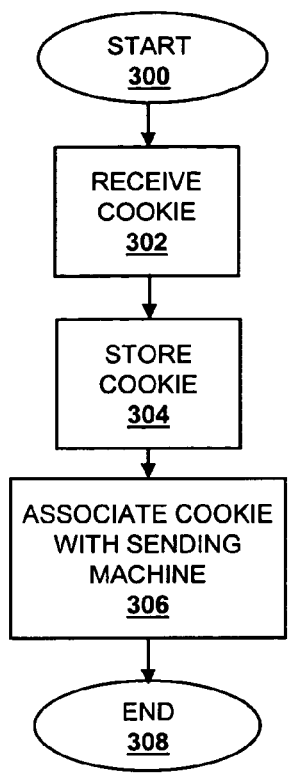
FIG. 3A is a high-level logical flowchart of a process for receiving, storing and associating a cookie to enable sending of data, over a network, to a storage buffer assigned to an application in accordance with a preferred embodiment of the present invention.

With reference now to FIG. 3A, there is depicted a high-level logical flowchart of a process for receiving, storing and associating a cookie to enable sending of data, over a network, to a storage buffer assigned to an application in accordance with a preferred embodiment of the present invention. The process begins at step 300, which is the start of the process and typically involves operation of a receive routine in remote data processing system 104. The process then proceeds to step 302, which illustrates remote data processing system 104 receiving cookie delivery message 140 containing cookie 138. The process next moves to step 304, which depicts remote data processing system 304 extracting and storing cookie 138. Remote data processing system 104 then associates cookie 138 in storage with local data processing system 102, as shown at block 306. The process thereafter terminates at step 308.

The creation and delivery of cookie 138 enables a communication process in which subsequent data requests by application 113c are transmitted with cookie 138. That is, application 113c sends a data request 142 to TCP/IP stack 118, and TCP/IP stack 118 adds cookie 138 to data request 142. TCP/IP stack 118 then routes data request 142 to network driver 116. Network driver 116 then passes data request 142 to operating system 114, which, through the operation of processing resource 106, sends data request 142 to remote data system 104 over network 100 via network interface 110.

Figure 3B:
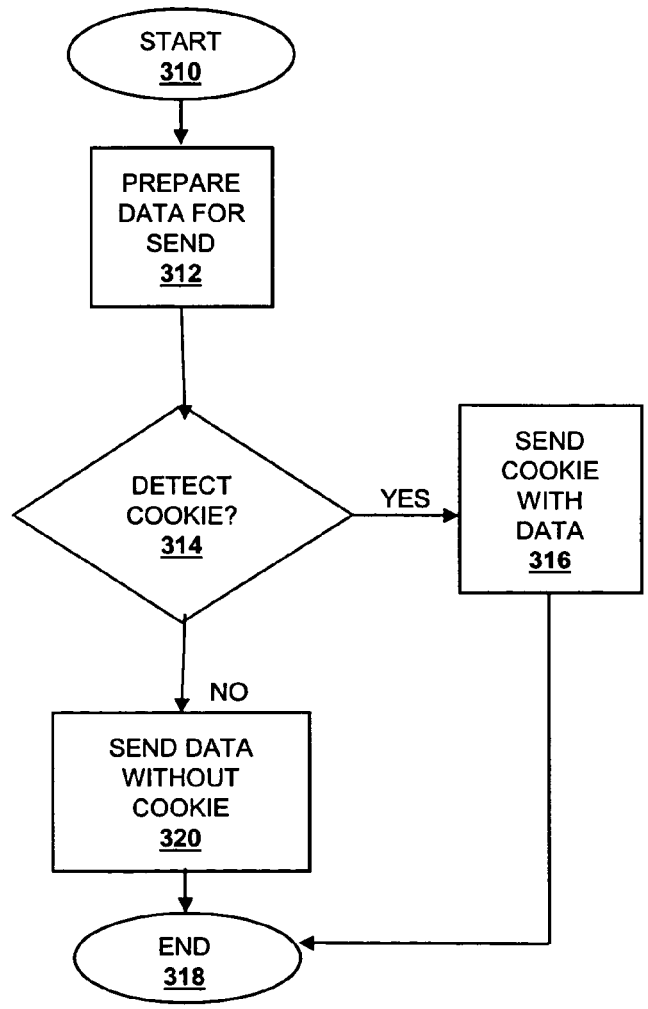
FIG. 3B is a high-level logical flowchart of a process for sending data, over a network, to a storage buffer assigned to an application in accordance with a preferred embodiment of the present invention.
Figure 4:
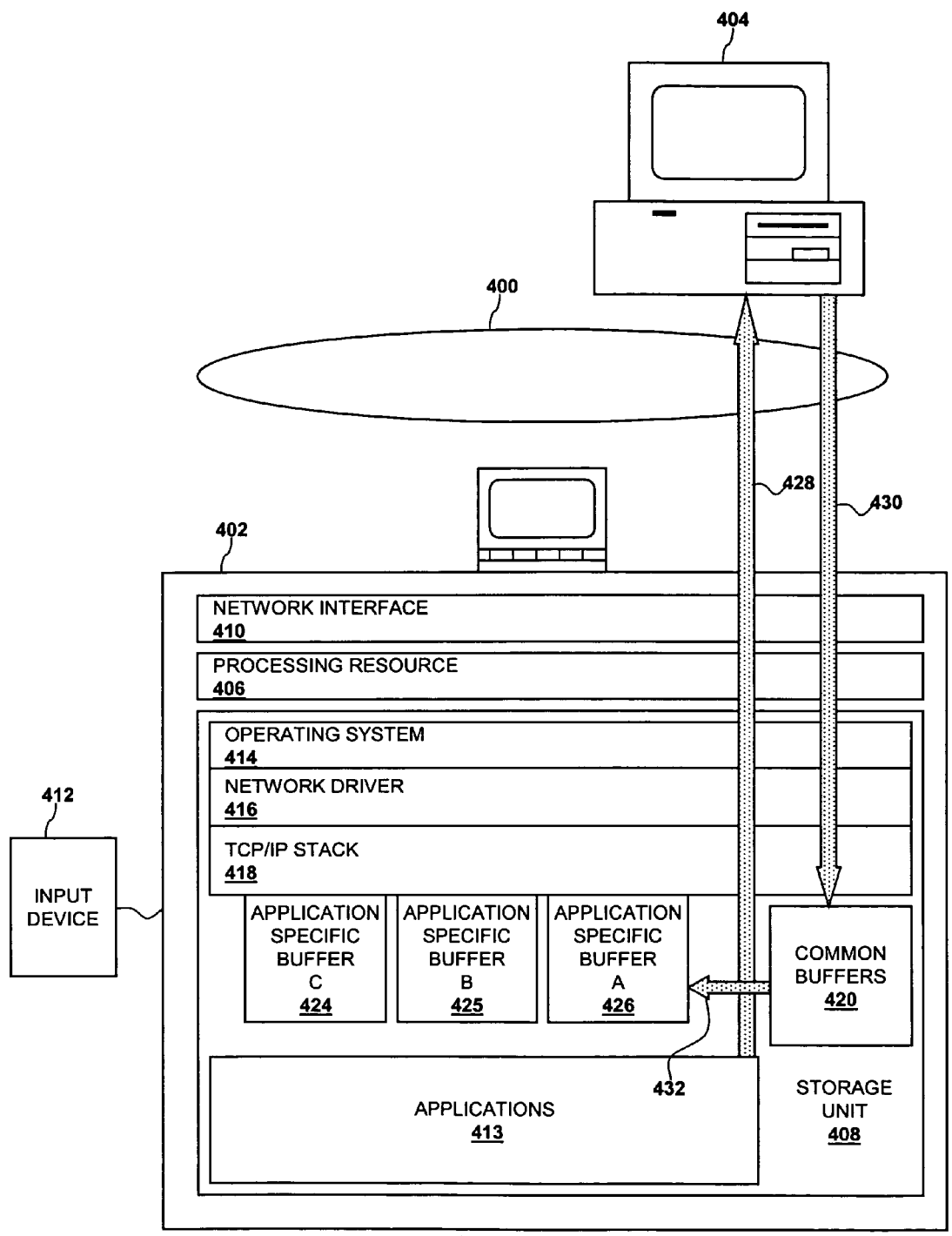
FIG. 4 illustrates a data processing system in a network environment delivering data received from a network directly to a common buffer and copying to an application-specific buffer according to the method of the prior art.

With reference now to FIG. 3B, a high-level logical flowchart of a process for sending data, over a network, to a storage buffer assigned to an application in accordance with a preferred embodiment of the present invention is illustrated. The process depicted in FIG. 3B is performed on remote data processing system 104. The process begins at step 310, which depicts the start of the process, typically in response to startup of a routine designed to receive data request 142 from local data processing system 102. The process then proceeds to step 312, which illustrates remote data processing system 104 receiving data request 142 from local data processing system 102. The process next moves to step 314, which depicts remote data processing system 104 determining whether remote data processing system 104 stores or has possession of a cookie 138 in association with local data processing system 102. Upon receipt of data request 142, remote data processing system 104, responds to data request 142 by determining whether cookie 138 is present.

The function described above with respect to step 314 provides for multiple modes of operation. If remote data processing system 104 is sending data to local data processing system 102 as the result of a data request 142 containing cookie 138 from local data processing system 102, the process depicted with respect to step 314 will detect cookie 138 in data request 142. If, instead of sending data in response to data request 142 containing cookie 138, unrequested data is being sent to local data processing system 102, the process for registering and storing a cookie of FIG. 3A allows remote data processing system to detect a pre-stored cookie in step 314. Unrequested data could be sent to local data processing system 102, for example, through the operation of a push server, or local data processing system 102, for whatever reason, might not send cookie 138 with all requests.

If remote data processing system 104 determines that a cookie 138 has been acquired or stored for the requesting local data processing system 102, then the process proceeds to step 316, which illustrates remote data processing system 104 sending response 144 with cookie 138 to local data processing system 102. Responsive to detecting a pre-stored or cookie 138 in data request 142, remote data processing system 104 sends response 144, which contains cookie 138 over network 100 to network interface 110 of local data processing system 102. The process next moves to step 318, which depicts the end of the process.

If, in step 314 above, remote data processing system 104 determines that no cookie has been stored or included within data request 142 for the requesting local data processing system 102, then the process proceeds to step 320, which illustrates remote data processing system 104 sending response 144 without cookie 138 to local data processing system 102. The process then ends at step 318.

Figure 2B:
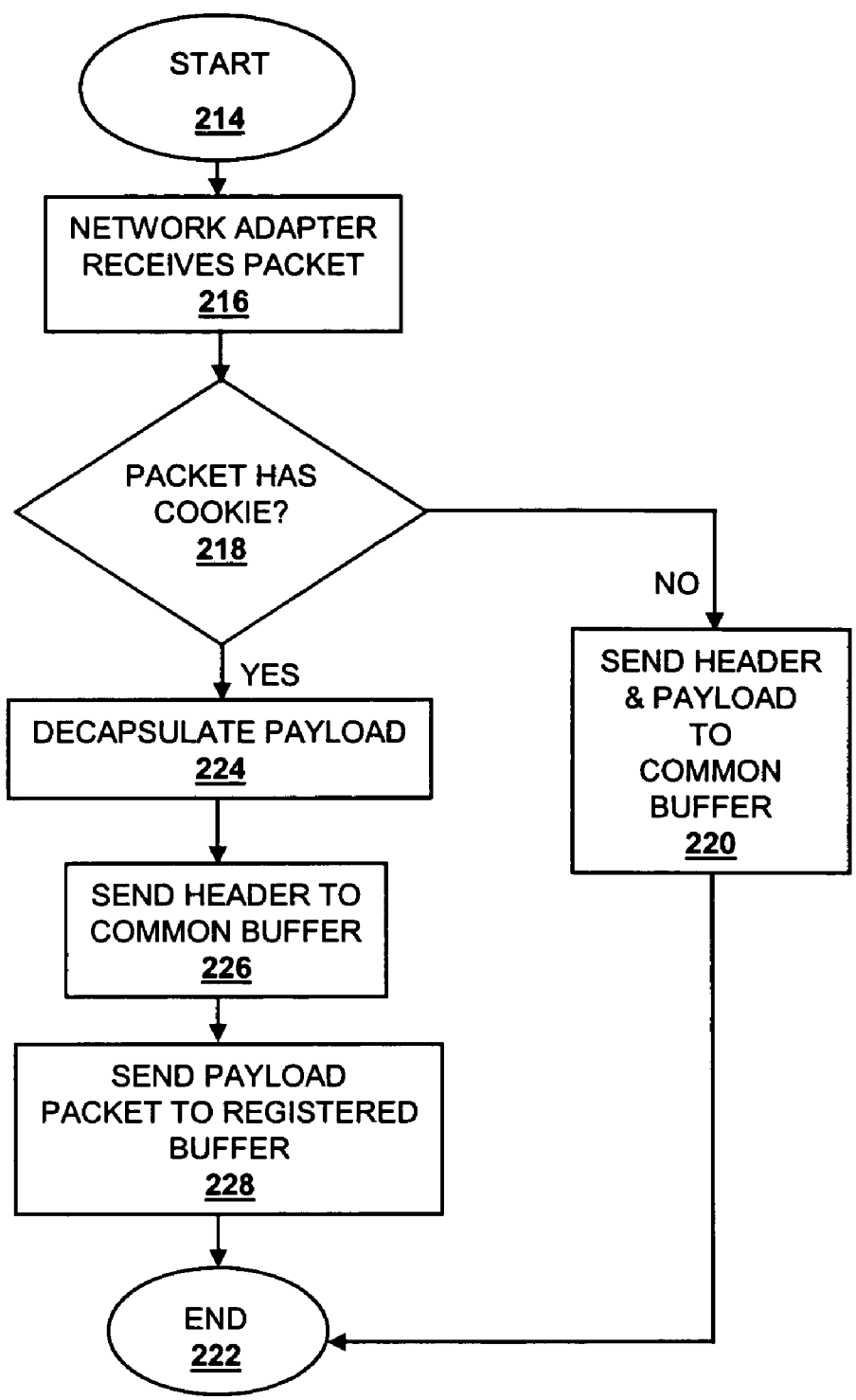
FIG. 2B is a high-level logical flowchart of a process for delivering data, received from a network, to a storage buffer assigned to an application in accordance with a preferred embodiment of the present invention.

With reference now to FIG. 2B, a high-level logical flowchart of a process for delivering data, received from a network, to a storage buffer assigned to an application in accordance with a preferred embodiment of the present invention is illustrated. The process begins at step 214, typically with the invocation of a receive routine within network driver 116 of local data processing system 102. The process then proceeds to step 216, which illustrates network driver 116 receiving response 144, which contains data requested by request 142 in FIG. 1 above. The process next moves to step 218, which depicts network driver 116 determining whether response 144 contains cookie 138.

If network driver 116 determines that response 144 does not contain cookie 138, then the process proceeds to step 220, which illustrates network driver 116 sending response 144 to common buffer 120. In this case, response 144 is handled in the conventional manner described above with respect to data delivery 430.

That is, processing resource 106 routes data delivery 130 from network interface 110 to operating system 114 in storage unit 108. Once data delivery 130 has arrived within storage unit 108, operating system 114 routes both payload data and header data within data delivery 130 from network driver 116 to TCP/IP stack 118. Both payload data and header data from data delivery 130 are then routed to common buffers 120. Once payload data and header data from data delivery 130 reach common buffers 120, a copy 132 of payload data from data delivery 130 is routed to application specific buffer 126, where processing resource 106 can employ copy 132 in conjunction with the instructions of application 112. Following this conventional handling, the process shown in FIG. 2B terminates at step 222.

Returning to block 218 above, if network interface 110 determines that response 144 contains cookie 138, then the process proceeds to step 224. Step 224 illustrates network interface 110 decapsulating payload from response 144. The process then proceeds to step 226, which depicts network interface 110 sending header information 146 from response 144 to common buffer 120 to facilitate the maintenance of TCP/IP stack 118.

As is shown at step 228, the payload 145, in contrast, is transmitted by network driver 116 directly to application-specific buffer 126. Processing resource 106 can then employ payload 145, which the present invention has allowed to bypass common buffers 120, in conjunction with the instructions of application 112. The process then moves to step 222, which depicts the end of the process.

The bypass discussed above with respect to step 228 provides tremendous utility by eliminating the copying of data first to common buffer 120 and then to application specific buffer C 126. Under the method of the prior art, data, requested by application 113c must first be copied to common buffer 120 and then to application specific buffer C 126. The copying employed by the method of the prior art delays the arrival of data at application specific buffer C 126, thereby delaying the operation of all processes that depend on the arrival of data in application specific buffer C 126. By eliminating the copying step of the prior art, the latency incurred waiting for data to arrive in application specific buffer C 126 is reduced, and overall system performance is improved.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

What is claimed is:

1. A method of communication, comprising:
designating a common communication buffer and an application-specific communication buffer within a local data processing system for buffering data communicated with an application of the local data processing system;
reporting to a network interface of said local data processing system a memory address of said application-specific communication buffer;
creating a cookie containing said memory address;
sending said cookie from the local data processing system to a remote data processing system, such that said remote data processing system may address said data directly to said application-specific communication buffer;
receiving in said network interface a packet containing said cookie, said packet including header information and data that is the payload of the packet;
said network interface delivering the header information from said packet to the common communication buffer in said local data processing system; and
said network interface delivering the data from said packet without the header information directly to said application-specific communication buffer without first buffering the data in the common communication buffer.

* * * * *